G. V. HARRIMAN.
TRANSMISSION GEARING.
APPLICATION FILED DEC. 18, 1913. RENEWED JUNE 2, 1916.

1,210,798.  Patented Jan. 2, 1917.

Witnesses
C. M. Walker
F. Wm. Ernst

Inventor,
George V. Harriman,
By Frederick V. Winters,
Attorney

UNITED STATES PATENT OFFICE.

GEORGE V. HARRIMAN, OF NEW YORK, N. Y.

TRANSMISSION-GEARING.

1,210,798.　　　　Specification of Letters Patent.　　Patented Jan. 2, 1917.

Application filed December 18, 1913, Serial No. 807,528. Renewed June 2, 1916. Serial No. 101,382.

*To all whom it may concern:*

Be it known that I, GEORGE V. HARRIMAN, a citizen of the United States, residing at New York, in the county and State of New York, have invented certain new and useful Improvements in Transmission-Gearing, of which the following is a full, clear, and exact specification.

This invention relates to gearing especially adapted for use in the transmission of automobiles, and it has for its object to simplify the construction of such gearing, to dispense with the noise and jerky motions incident to throwing in sliding gears, to obviate the stripping of the gears which is apt to occur from the slightest carelessness of the driver when sliding gears are used, to reduce the cost of maintenance and repairs, and to provide for varying the power and speed of the driving mechanism with which the transmission is coupled in use.

Other objects will become apparent as the description proceeds.

The invention will be first hereinafter described in connection with the accompanying drawings, which constitute a part of the specification, and then more specifically defined in the claim at the end of the description.

Figure 1:
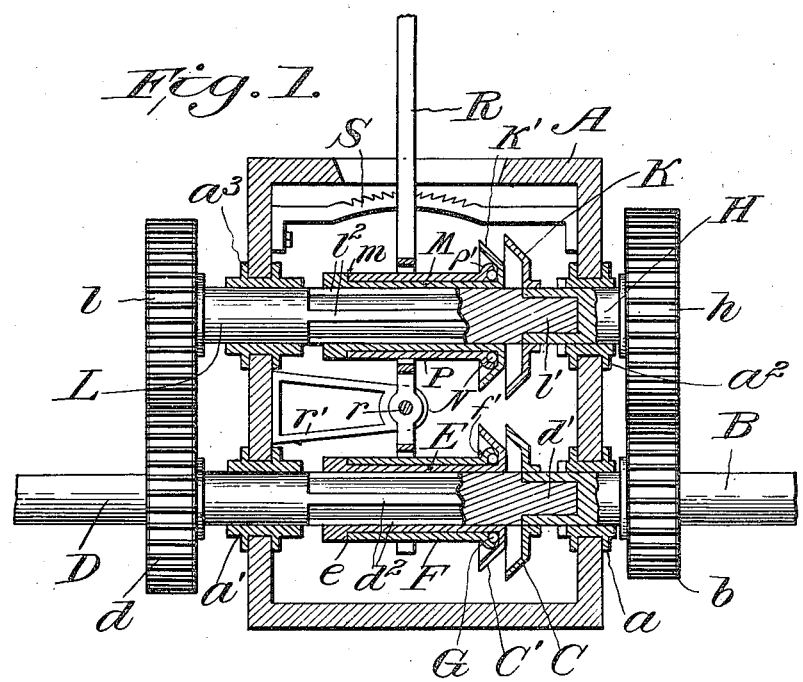
Figure 2:
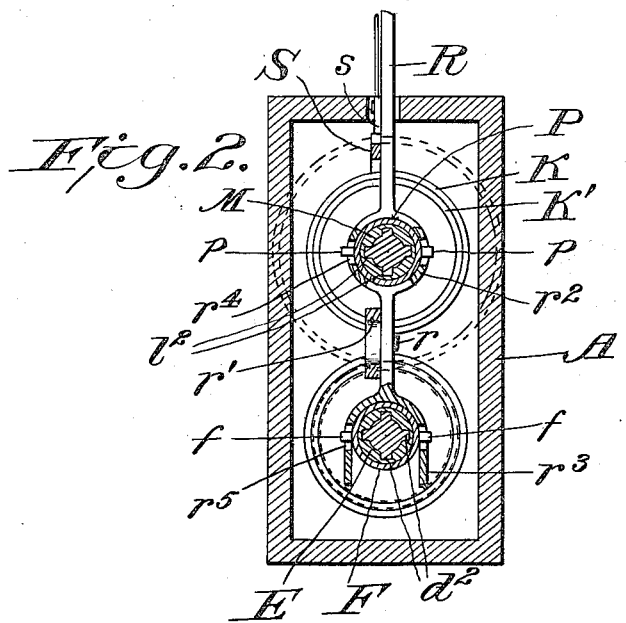

In the accompanying drawings, wherein similar reference characters are used throughout the several views to indicate corresponding parts:—Figure 1 is a sectional view taken longitudinally of the shafts, and Fig. 2 is a transverse section.

Referring more particularly to the drawings, A designates the casing for the clutches and operating lever to be presently described. The driving or motor shaft B is journaled at $a$ in the casing and carries a gear $b$ and a friction cone clutch member C, both fast thereon. The gear is arranged outside the casing, but the clutch member is housed within the casing.

A driven shaft D is journaled in the casing at $a'$ and has its inner end reduced and journaled in a cavity or bore in the end of the driving shaft B, as at $d'$. The shaft D carries a gear $d$ outside the casing and inside said casing is fitted with a splined supplemental clutch member C'. In order to strengthen the sliding connection between the clutch member C' and the shaft D, the latter may be formed with a plurality of longitudinal ribs or dogs $d^2$ separated by grooves, and the interior of a sleeve portion E of the clutch member C' is formed to correspond as best illustrated in Fig. 2. Mounted loosely around the sleeve E is a collar F having radially and oppositely extending pins $f$ for engagement with the operating lever hereinafter described. Ball bearings G are interposed between the end of the collar F and the clutch member C' for reducing friction. The other end of the collar abuts against a shoulder $e$ on the sleeve E. It will be noted that the end $f'$ of the collar against which the ball bearings impinge are flared outwardly and slightly curved so as to fit closely within the reversely flared outer face of the conical clutch member C' and also extend partially around the balls, thus forming a raceway of extremely simple construction which is practically closed against dust.

A pair of secondary shafts are journaled in the casing above the driving and driven shafts B and D. The secondary shaft H, which corresponds to the driving shaft, is journaled in the casing at $a^2$ and carries a fast gear $h$ constantly in mesh with the gear $b$. Said shaft H also carries a fast friction clutch member K. The other secondary shaft L is journaled in the casing at $a^3$ and carries a fast gear $l$ constantly in mesh with the gear $d$ on the driven shaft. The inner end of the shaft L is reduced and journaled in the inner end of the shaft H, as at $l'$ in the same manner as already described in connection with the shafts D and B. Said shaft L is also formed with longitudinally extending ribs or dogs $l^2$ similar to the dogs $d^2$, and upon said shaft is splined the clutch member K' having a sleeve portion M around which is loosely fitted the collar P abutting at one end against the shoulder $m$ on the sleeve, and having the flared flange $p'$ at its other end to engage the ball bearings N. The collar P has pins $p$, Fig. 2, engaging slots in the operating lever.

The operating lever R is pivoted at $r$ to a bracket $r'$ projecting interiorly of the casing. On one side of its pivot or fulcrum $r$, the lever is formed with a fork $r^3$ while at the other side of said fulcrum the lever has a ring $r^2$. The fork $r^3$ embraces the collar F and has slots $r^5$ through which the pins $f$ on the collar F extend. The ring $r^2$ embraces the collar P and has slots $r^4$ engaged by the pins $p$ on said collar. A rack S, arranged in the upper portion of the casing, is designed to be engaged by a pawl s carried by the lever for retaining said lever at the desired position.

From the foregoing description it will be seen that when the lever is in the neutral position illustrated, both clutches are thrown out and the gears $b$ and $h$ with their shafts B and H are all that will turn. If the lever is swung to the left, Fig. 1, the clutch C, C' will be thrown in and the shaft D coupled up directly to the shaft B, the shaft L remaining uncoupled from the shaft H. On the other hand, if the lever is swung to the right, the clutch K, K' will be thrown in while the clutch C, C' will be left out, thus effecting a drive through the secondary shafts H and L, it being understood that the gears $b$ and $h$ and the gears $l$ and $d$ are always in mesh, respectively.

By using friction cone clutches, it will be seen that all the objectionable noise of coupling and uncoupling will be eliminated, as well as the danger of stripping the gears. Moreover, the construction provided herein may be very easily operated owing to the ball bearings and sliding sleeves instead of sliding gears. It will also be noted that the parts of the driving and driven shafts and the secondary shafts are interchangable, as are also the gears of each meshing pair, the shafts being the same diameter, so that the power and speed may be easily varied by changing the relative positions of the gears on the several shafts. The arrangement of the gears on the outside of the casing helps to make these adjustments quick and easy, and the provision for said adjustments greatly decreases the cost of maintenance and repairing.

Having thus described my invention, what I claim as new and desire to secure by Letters Patent of the United States is:—

The combination with a casing, of a driving shaft journaled in the casing and having a gear arranged outside the casing and a friction clutch member arranged in the casing, a driven shaft arranged in line with the driving shaft and also journaled in the casing, said driven shaft having a gear outside the casing and a friction clutch member inside the casing, the latter clutch member being supplemental to the one on the driving shaft, and splined on the driven shaft, a pair of secondary shafts journaled in the casing and carrying gears and supplemental friction clutch members like those on the driving and driven shafts, the gears on the secondary shafts being constantly in mesh with the respective gears on the driving and driven shafts and all the friction clutch members being housed in the casing, and means for simultaneously throwing in one clutch and throwing out the other clutch.

In testimony whereof I have signed my name to this specification in the presence of two attesting witnesses.

GEORGE V. HARRIMAN.

Witnesses:
PHILIP LEUN,
EMMA KRAHE.